United States Patent

[11] 3,596,337

| [72] | Inventors | Donald W. Arnold<br>Fort Worth;<br>Orien M. Knight, Hurst; John A. Nelson, Fort Worth, all of, Tex. |
|---|---|---|
| [21] | Appl. No. | 803,191 |
| [22] | Filed | Feb. 28, 1969 |
| [45] | Patented | Aug. 3, 1971 |
| [73] | Assignee | United Tool Corporation<br>Euless, Tex. |

[54] UNIVERSAL CUTOFF AND GROOVING TOOL
7 Claims, 3 Drawing Figs.

| [52] | U.S. Cl. | 29/96 |
|---|---|---|
| [51] | Int. Cl. | B26d 1/00 |
| [50] | Field of Search | 29/95, 96, 97, 98, 105, 105.1 |

[56] References Cited
UNITED STATES PATENTS

| 2,296,597 | 9/1942 | Carr | 29/96 |
|---|---|---|---|
| 2,398,913 | 4/1946 | Anthony et al. | 29/96 |
| 2,450,365 | 9/1948 | Thompson et al. | 29/96 |
| 2,453,959 | 11/1948 | Anthony et al. | 29/96 |
| 3,125,798 | 3/1964 | Stein | 29/98 |
| 3,296,683 | 1/1967 | Karser | 29/96 |

FOREIGN PATENTS

| 1,008,906 | 2/1952 | France | 29/96 |
|---|---|---|---|

Primary Examiner—Harrison L. Hinson
Attorney—Richards, Harris & Hubbard

ABSTRACT: A toolholder for positioning lathe-type cutoff and grooving tools to cut workpieces located on either the left-hand or the right-hand side of the tool and either above or below the tool. The toolholder includes a pair of identical J-clamps located on the left-hand and right-hand sides of the holder for selectively securing a cutoff and grooving tool on either side of the holder. The J-clamps are adapted for adjustment from either the top or the bottom of the holder so that the holder can be used either upright or upside down.

PATENTED AUG 3 1971  3,596,337
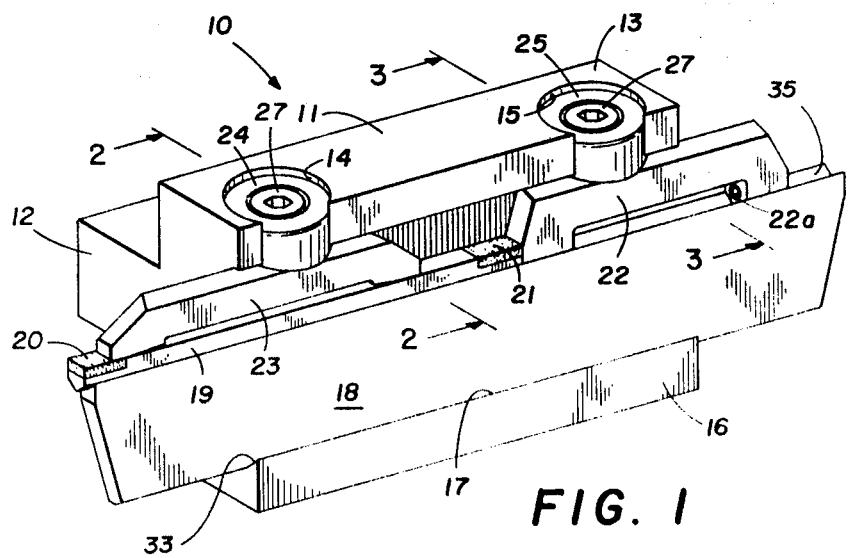
FIG. 1
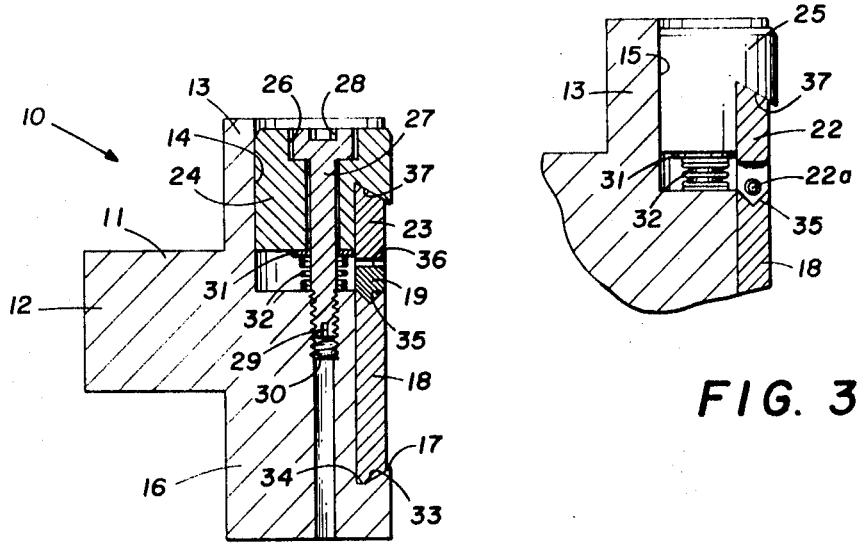
FIG. 2
FIG. 3
INVENTORS
DONALD W. ARNOLD
ORIEN M. KNIGHT
JOHN A. NELSON
Richards, Harris & Hubbard
ATTORNEYS

UNIVERSAL CUTOFF AND GROOVING TOOL

BACKGROUND OF THE INVENTION

In the metalworking industry toolholders are used in machine tools such as lathes to support and position cutting tools with respect to workpieces to be cut. Heretofore most toolholders have been designed to support cutting tools in only one position, for example, extending leftwardly and facing upwardly of the toolholder. This limits such toolholders to use in cutting operations in which the workpiece is oriented at a certain attitude with respect to the toolholder, for example, above and to the left of a toolholder that positions cutting tools leftwardly and upwardly. Since many lathe operations require different workpiece and cutting tool orientations, the fact that most toolholders are capable of supporting cutting tools in only one position has necessitated the manufacture of many variations of each toolholder design in order to assure the capability of supplying a toolholder for use in every lathe operation.

SUMMARY OF THE INVENTION

A toolholder for supporting a cutting tool in any desired position including at least one clamping member for securing the cutting tool to the toolholder with the cutting tool extending from either the left-hand or the right-hand side of the toolholder. More particularly, a universal cutoff and grooving tool comprising a support having two ends, a cutting tool selectively clamped at either end of the support and a cutting tool backup member selectively clamped on the support at either end of the cutting tool.

DESCRIPTION OF THE DRAWING

A more complete understanding of the invention may be had by referring to the following detailed description when taken in conjunction with the drawing wherein:

FIG. 1 is a perspective view of a cutoff and grooving tool employing the invention;

FIG. 2 is a sectional view taken along the line 2—2 in FIG. 1 in the direction of the arrows; and FIG. 3 is a partial sectional view taken along the line 3—3 in FIG. 1 in the direction of the arrows.

DETAILED DESCRIPTION

Referring now to the drawing, wherein like reference numerals designate like parts throughout the several views, and referring particularly to FIG. 1 thereof, there is shown a universal cutoff and grooving tool 10 including a holder 11 which serves as a supporting frame for the remaining components of the device. The holder 11 includes an attaching portion 12 used to secure the tool 10 in a turret lathe or the like, an upper portion 13 having a pair of generally circular J-clamp receiving holes 14 and 15 formed in it and a lower portion 16. A generally upwardly facing groove 17 is formed in the lower portion 16 and extends across the width of the holder 11.

A support blade 18 is mounted in the groove 17 of the holder 11 and serves to support a cutting tool 19 having a pair of carbide tips 20 and 21 extending from its left- and right-hand ends, respectively. A tool backup member 22 is supported on the support blade 18 in engagement with the tool 19 and includes a pair of adjusting screws 22a which extend from its left- and right-hand ends (only one which is shown). A clamp blade 23 is positioned on the tool 19 and the clamp blade 23, the tool 19 and the backup 22 are clamped in engagement with the support blade 18 by a pair of identical, cylindrically shaped J-clamps 24 and 25 mounted in the circular J-clamp receiving holes 14 and 15 of the holder 11, respectively.

Referring now to FIG. 2, the details of the mounting of the J-clamps 24 and 25 in the holder 11 are shown. Each of the J-clamps 24 and 25 has a capscrew-receiving hole 26 extending axially through it. A capscrew 27 having a hexagonal hole 28 in its upper end and a screwdriver slot 29 in its lower end extends through each hole 26 into threaded interengagement with a threaded hole 30 formed through the holder 11. Positioned below each of the J-clamps 24 and 25 in the J-clamp receiving holes 14 and 15 is a washer 31 and a spring 32 which serves to urge its respective J-clamp upwardly. The springs 32 support the J-clamps 24 and 25 while the support 18, the tool 19, the backup 22 and the clamp 23 are positioned under them.

FIG. 2 also illustrates the details of the mounting of the support blade 18 and the clamp blade 23 in the holder 11. The slot 17 extending across the width of the holder 11 is comprised of a sloping surface 33 which extends downwardly and inwardly with respect to the holder 11 and a flat surface 34 which extends inwardly with respect to the holder 11 from the end of the surface 33. The support blade 18 is provided with sloping and flat surfaces that mate with the surfaces 33 and 34 of the holder 11, respectively, and with a female V-shaped groove 35 that extends along its entire upper surface. The tool 19 is provided with a V-shaped surface that mates with the V-shaped groove 35 in the support blade 18 and with a flat upper surface 36. The lower surface of the clamp blade 23 is flat so that it mates with the flat surface 36 of the tool 19 while the upper surface of the clamp blade 23 slopes upwardly so that it mates with an upwardly sloping surface 37 formed on the J-clamp 24.

Referring to FIG. 3, it will be seen that a sloping surface 37 is also formed in the J-clamp 25 and that the upper and lower surfaces of the tool backup 22 are identical with the upper surface of the clamp blade 23 and the lower surface of the tool 19, respectively, so that the periphery presented by the tool backup 22 to the support blade 18 and to the J-clamp 25 is identical to the periphery presented to the support blade 18 and to the J-clamp 24 by the combination of the tool 19 and the clamp blade 23.

Because the backup 22 is removable and presents an outer periphery identical to the periphery presented by the combination of the tool 19 and the clamp 23, the universal cutoff and grooving tool 10 can be assembled with the cutting tool 19 extending from either of its ends. Because the holes 30 in the holder 11 extend through the holder and because the capscrews 27 are provided with the screwdriver slots 29, the J-clamps 24 and 25 can be tightened or loosened from either the top or the bottom of the holder 11. Thus, the cutoff and grooving tool 10 can be used to present either of the carbide tips 20 and 21 of the insert 19 in any desired orientation: right or left; up or down.

The construction shown in the drawings has several advantages over prior cutoff and grooving tool designs in addition to universal cutting tool positioning. First, the cylindrical shape of the J-clamps 24 and 25 together with the circular shape of the holes 14 and 15 results in a very rigid clamping of the tool 19. Second, the adjustable mounting of the support blade 18 in the holder 11 and of the backup 22 in the support 18 allows the use of various length cutting tools 19 in the cutoff and grooving tool 10. Third, the adjusting screws 22a of the backup 22 permit fine adjustment of the positioning of the cutting tool 19 while clamping pressure is maintained on the support blade 18. Fourth, because of its adjustable positioning, relatively long length and two-point contact with the tool 19, the clamp blade 23 applies clamping pressure near the end of the cutting tool 19, thereby eliminating chatter. And fifth, the spring loading of the J-clamps 24 and 25 automatically compensates for slight alignment error of the mating parts.

Although a preferred embodiment of the invention has been described in detail, it is to be understood that various changes, substitutions, and alterations can be made therein without departing from the spirit of the invention.

What we claim is:

1. A cutoff and grooving tool comprising:
   a frame
   a support member mounted on the frame and having a V-shaped slot formed in it;

a cutting tool positioned in the slot in the support member;

a backup member positioned in the slot in the support member in engagement with the cutting tool;

clamping means mounted on the frame for securing the cutting tool and the backup member in the slot with the backup member selectively positioned at either end of the cutting tool;

said backup member having a predetermined exterior shape positioned in engagement with said clamping means, and a cutting tool clamping member positioned in engagement with the cutting tool and with the clamping means and having the same predetermined exterior shape as the backup member positioned in engagement with the clamping means.

2. The tool according to claim 1 wherein the clamping means comprises a pair of identical J-clamps mounted on the frame and having clamping surfaces shaped to mate with the predetermined exterior shape of the backup member and the clamping member.

3. The toolholder according to claim 1 wherein the similar clamping members comprise identical J-clamps, identical springs positioned between the J-clamps and the frame and identical screws for securing the J-clamps to the frame and wherein the screws are adjustable with respect to the frame from either of their ends.

4. A universal cutting toolholder including:
a frame having a circular hole formed in it;
a support member mounted on the frame;
a cutting tool mounted on the support member;
a clamping member mounted on the cutting tool, and
a cylindrical J-clamp having the same diameter as the circular hole mounted in the circular hole in engagement with the clamping member for securing the cutting tool to the frame.

5. The toolholder according to claim 4 further including a spring positioned in the circular hole between the frame and the J-clamp.

6. The toolholder according to claim 4 wherein the clamping member is an elongate blade that engages the cutting tool at two spaced points.

7. The toolholder according to claim 4 wherein the support member is an elongate blade that is slidably supported on the frame.